United States Patent
Shanmuga Vadivel et al.

(10) Patent No.: US 11,017,818 B2
(45) Date of Patent: May 25, 2021

(54) EVENT-BASED MEDIA PLAYBACK

(71) Applicant: Synaptics Incorporated, San Jose, CA (US)

(72) Inventors: Karthikeyan Shanmuga Vadivel, San Jose, CA (US); Tae won Kang, Cupertino, CA (US); Umha Mahesh Srinivasan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/534,212

(22) Filed: Aug. 7, 2019

(65) Prior Publication Data

US 2020/0211601 A1 Jul. 2, 2020

Related U.S. Application Data

(60) Provisional application No. 62/787,704, filed on Jan. 2, 2019.

(51) Int. Cl.

| | |
|---|---|
| *G11B 27/30* | (2006.01) |
| *H04N 21/472* | (2011.01) |
| *G06N 3/08* | (2006.01) |
| *H04N 21/81* | (2011.01) |
| *H04N 21/466* | (2011.01) |

(52) U.S. Cl.
CPC .......... *G11B 27/3081* (2013.01); *G06N 3/08* (2013.01); *H04N 21/4666* (2013.01); *H04N 21/47217* (2013.01); *H04N 21/8133* (2013.01)

(58) Field of Classification Search
CPC .............................. G06N 3/08; G11B 27/3081
See application file for complete search history.

(56) References Cited

U.S. PATENT DOCUMENTS

| | | | | |
|---|---|---|---|---|
| 2014/0304730 A1* | 10/2014 | Lettau | ...................... | H04N 5/91 725/32 |
| 2015/0074703 A1* | 3/2015 | Cremer | .............. | H04N 21/4722 725/19 |
| 2017/0372749 A1* | 12/2017 | Ramaswamy | ......... | G11B 27/34 |

* cited by examiner

*Primary Examiner* — Girumsew Wendmagegn
(74) *Attorney, Agent, or Firm* — Paradice & Li LLP

(57) ABSTRACT

A method and apparatus for event-based media playback. A media device infers one or more actionable events in a media content item using one or more neural network models and determines a respective start location for each of the actionable events in the media content item. The media device receives user input indicating a selection of one of the actionable events and selectively initiates playback of the media content item at the start location associated with the selected actionable event.

18 Claims, 9 Drawing Sheets

EVENT-BASED MEDIA PLAYBACK

CROSS-REFERENCE TO RELATED APPLICATION

This application claims priority and benefit under 35 USC § 119(e) to U.S. Provisional Patent Application No. 62/787,704, filed on Jan. 2, 2019, which is incorporated herein by reference in its entirety.

TECHNICAL FIELD

The present embodiments relate generally to systems and devices for media playback.

BACKGROUND OF RELATED ART

A media device may be any device capable of displaying and/or playing back various forms of media content (e.g., music, video, images, and the like). Examples of media devices may include, but are not limited to, recorders, editors, televisions, set-top boxes, music players, digital photo frames, digital cameras, personal computing devices (e.g., desktop computers, laptop computers, netbook computers, tablets, web browsers, e-book readers, and personal digital assistants (PDAs)), data output devices (e.g., display screens and printers), remote terminals, kiosks, video game machines (e.g., video game consoles, portable gaming devices, and the like), communication devices (e.g., cellular phones such as smart phones), and the like.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for event-based media playback is disclosed. One innovative aspect of the subject matter of this disclosure can be implemented in a method of playing back media content by a media device. In some embodiments, the method may include steps of inferring one or more actionable events in a media content item using one or more neural network models; determining a respective start location for each of the actionable events in the media content item; receiving user input indicating a selection of one of the actionable events; and selectively initiating playback of the media content item at the start location associated with the selected actionable event.

Another innovative aspect of the subject matter of this disclosure can be implemented in a method of playing back media content by a media device. In some embodiments, the method may include steps of receiving a first media content item; detecting one or more actionable events in the first media content item; determining a respective start location for each of the actionable events in the first media content item; receiving user input indicating a selection of one of the actionable events; retrieving a second media content item based at least in part on the selected actionable event; and initiating playback of the first media content item, together with the second media content item, at the start location associated with the selected actionable event.

BRIEF DESCRIPTION OF THE DRAWINGS

The present embodiments are illustrated by way of example and are not intended to be limited by the figures of the accompanying drawings.

DETAILED DESCRIPTION

Figure 1:
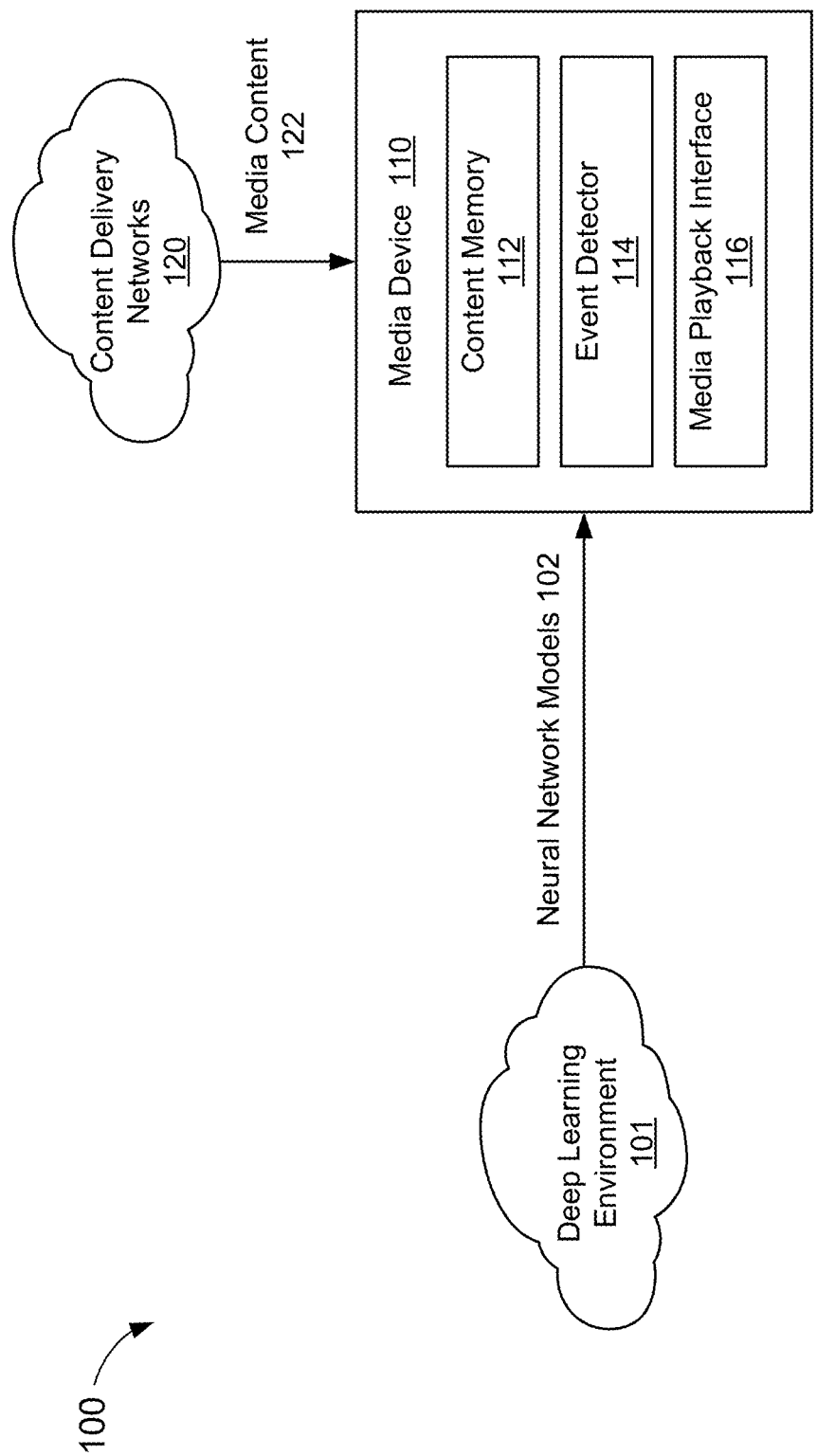
FIG. 1 shows a block diagram of a media playback system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein, may refer to any general-purpose processor, conventional processor, controller, microcontroller, and/or state machine capable of executing scripts or instructions of one or more software programs stored in memory. The term "media device," as used herein, may refer to any device capable of displaying and/or playing back various forms of media content (e.g., music, video, images, and the like). Examples of media devices may include, but are not limited to, recorders, editors, televisions, set-top boxes, music players, digital photo frames, digital cameras, personal computing devices (e.g., desktop computers, laptop computers, netbook computers, tablets, web browsers, e-book readers, and personal digital assistants (PDAs)), data output devices (e.g., display screens and printers), remote terminals, kiosks, video game machines (e.g., video game consoles, portable gaming devices, and the like), communication devices (e.g., cellular phones such as smart phones), and the like.

FIG. 1 shows a block diagram of a media playback system 100, in accordance with some embodiments. The system 100 includes a deep learning environment 101 and a media device 110. The deep learning environment 101 may include memory and/or processing resources to generate or train one or more neural network models 102. In some embodiments, the neural network models 102 may be implemented on the media device 110. For example, the media device 110 may use the neural network models 102 to detect and/or identify actionable events in media content.

Some forms of live or recorded entertainment may have periods of down-time or inactivity that may be of little or no interest to some viewers. For example, some sports are characterized by short bursts of high activity (e.g., segments of interest) followed by lengthy lulls in the action. Aspects of the present disclosure recognize that many segments of interest are often preceded by a well-defined and repeating "actionable event." In baseball, for example, much of the action occurs after the pitcher pitches the baseball to home plate. Immediately after the pitch, there may be a brief duration of intense action (e.g., batter hits the ball, base runners run around the bases, etc.) before the players reset for the next pitch. Thus, the pitching of the baseball may correspond to an actionable event. Similarly, in football, much of the action occurs after the center snaps the football to the quarterback. Immediately after the snap, there may be a few seconds of intense action (e.g., quarterback passes the ball to a receiver, quarterback hands the ball off to a running back, etc.) before the players reset for the next snap. Thus, the snapping of the football may also correspond to an actionable event.

In some embodiments, one or more actionable events may be detected based on audio or sound from the media content. For example, aspects of the present disclosure recognize that cheering or clapping sounds (e.g., from the audience) may occur immediately following an exciting play or event. On the other hand, jeering or taunting sounds may occur during boring or uneventful periods of the media content. In some aspects, jeering or taunting sounds also may occur when the home team performs poorly and/or following an exciting play or event by the away team. Aspects of the present disclosure further recognize that the sound and/or image of a referee (e.g., the blowing of a whistle) may also signal an event of interest such as, for example, the end of a play, the start of a new play, or the occurrence of a foul or penalty.

Still further, in some embodiments, actionable events may be detected with varying degrees of granularity. In some aspects, actionable events may be organized or categorized by people and/or objects. For example, an actionable event may be detected when a particular player (or set of players) is on the field or otherwise in play. For even finer granularity of detection, an actionable event may be detected when a particular player (or set of players) scores one or more points. In some other aspects, actionable events may be organized or categorized by event type. For example, an actionable event may be detected for a scoring play. For even finer granularity of detection, an actionable event may be detected for a particular type of scoring play (e.g., home run, three-point basket, touchdown, and the like)

In some embodiments, the media playback system 100 may leverage actionable events in live or recorded media content to provide an enhanced viewing experience when playing back the media content (e.g., on the media device 110). For example, the media playback system 100 may analyze the media content to identify one or more actionable events. An actionable event may correspond to any action (or series of actions) that immediately precedes and/or forms at least part of a segment of interest to the user. Examples of actionable events may include, but are not limited to, a pitcher pitching a baseball, a center hiking a football, a player serving a tennis ball, and the like. In some embodiments, the media playback system 100 may use machine learning techniques to learn, detect, and/or infer actionable events in various types of media content. The media playback system 100 may further allow the user to control, navigate, or otherwise manipulate playback of the media content based at least in part on the actionable events.

The deep learning environment 101 may be configured to generate one or more neural network models 102 through deep learning. Deep learning is a particular form of machine learning in which the training phase is performed over multiple neural network layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models 102 may include a set of rules that can be used to describe an actionable event such as, for example, a baseball pitch, a football snap, a tennis serve, and the like.

The deep learning environment 101 may have access to a large volume of raw data and may be trained to recognize a set of rules (e.g., certain objects, features, and/or other detectable attributes) associated with the raw data. For example, in some aspects, the deep learning environment 101 may be trained to recognize a pitching action (e.g., in baseball). During the training phase, the deep learning environment 101 may process or analyze a large number of images and/or videos that contain pitches, for example, from recorded baseball games. The deep learning environment 101 may also receive an indication that the provided media contains a pitching action, for example, in the form of user input from a user or operator reviewing the media and/or data or metadata provided with the media. The deep learning environment 101 may then perform statistical analysis on the images and/or videos to determine a common set of features associated with baseball pitches. In some aspects, the determined features (or rules) may form an artificial neural network spanning multiple layers of abstraction. In some other aspects, the neural network (specifically, the final few layers) may be fine-tuned for more robust performance with a limited set of training data.

The deep learning environment 101 may provide the learned set of rules (e.g., as the neural network models 102) to the media device 110 for inferencing. When detecting actionable events in live or streaming media content on an embedded device, the inferencing time and/or size of the neural network may affect the performance of the embedded device. Thus, in some aspects, the neural network models 102 may comprise compact neural network architectures (including deep neural network architectures) that are more suitable for inferencing on embedded devices.

In some aspects, one or more of the neural network models 102 may be provided to (and stored on) the media device 110 at a device manufacturing stage. For example, the media device 110 may be pre-loaded with the neural network models 102 prior to being shipped to an end user. In some other aspects, the media device 110 may receive one or more of the neural network models 102 from the deep learning environment 101 at runtime. For example, the deep learning environment 101 may be communicatively coupled to the media device 110 via a network (e.g., the cloud). Accordingly, the media device 110 may receive the neural network models 102 (including updated neural network models) from the deep learning environment 101, over the network, at any time.

The media device 110 may be any device capable of capturing, storing, and/or playing back media content. Example media devices include set-top boxes (STBs), computers, mobile phones, tablets, televisions (TVs) and the like. The media device 110 may include a content memory 112, an event detector 114, and a media playback interface 116. The content memory 112 may store or buffer media content (e.g., images, video, audio recordings, and the like) for playback and/or display on the media device 110 or a display device (not shown for simplicity) coupled to the media device 110. In some embodiments, the media device 110 may receive media content 122 from one or more content delivery networks (CDNs) 120. In some aspects, the media content 122 may include live or previously-aired sports programming (e.g., baseball games, football games, tennis matches, and the like). In some other aspects, the media content 122 may include television shows, movies, and/or media content created by a third-party content creator or provider (e.g., television network, production studio, streaming service, and the like). In some implementations, the media device 110 may store or buffer the media content 122 in the content memory 112 for playback. For example, the content memory 112 may operate as a decoded video frame buffer that stores or buffers the (decoded) pixel data associated with the media content 122 to be rendered or displayed by the media device 110.

The event detector 114 may be configured to generate one or more inferences about the media content stored in the content memory 112. For example, in some aspects, the event detector 114 may analyze the media content 122 to infer or identify actionable events (e.g., baseball pitches, football snaps, tennis serves, and the like) contained therein. In some embodiments, the event detector 114 may generate the inferences based on the neural network models 102 provided by the deep learning environment 101. For example, during the inferencing phase, the event detector 114 may apply the neural network models 102 to new media content (e.g., images or videos) stored in the content memory 112, by traversing the artificial neurons in the artificial neural network, to infer information about the media content For example, the event detector 114 may identify frames of media content in which one or more actionable events occur. In some embodiments, the event detector 114 may further store the inferences (e.g., timestamps and/or frame identifiers associated with actionable events) along with the media content 122 in the content memory 112.

In some embodiments, the event detector 114 may use the media content stored or buffered in the content memory 112 to perform additional training on the neural network models 102. For example, the event detector 114 may refine the neural network models 102 and/or generate new neural network models based on the media content stored or buffered in the content memory 112. In some aspects, the event detector 114 may provide the updated neural network models to the deep learning environment 101 to further refine the deep learning architecture. In this manner, the deep learning environment 101 may further refine its neural network models 102 based on the media content stored on the media device 110 (e.g., combined with media content stored on various other media devices). By generating the inferences locally on the media device 110, the embodiments described herein may be used to perform machine learning on media content in a manner that protects user privacy and/or the rights of content providers.

The media playback interface 116 may provide an interface through which the user can operate, interact with, or otherwise use the media device 110. In some embodiments, the media playback interface 116 may enable a user to control the playback of media content stored in the content memory 112 based, at least in part, on the actionable events detected by the event detector 114. For example, while displaying or playing back the media content, the media playback interface 116 may enable a user to view a particular actionable event and/or skip through the actionable events in sequence. In some aspects, the media playback interface 116 may respond to user input by jumping to any actionable event in the media content. In some other aspects, the media playback interface 116 may respond to user input by fast-forwarding to the next actionable event, or rewinding to the previous action event, in the sequence.

Still further, in some aspects, the media playback interface 116 may retrieve additional or supplemental media content to be displayed or played back in relation to an actionable event. The supplemental media content may include one or more images or frames of video that are similar or otherwise related to the actionable event and/or a segment of the media content 122 associated with the actionable event. The media playback interface 116 may display or play back the supplemental media content together with a portion of the media content 122 associated with the actionable event. In some aspects, the media playback interface 116 may display or play back the supplemental media content concurrently with the corresponding segment of media content 122 (e.g., as a picture-in-picture). In some other aspects, the media playback interface 116 may display or play back the supplemental media content in isolation (e.g., at full-frame resolution), before or after playback of the corresponding segment of media content 122. In some other implementations, the media playback interface 116 may present the user with an option to display or play back the supplemental media content upon jumping or skipping to the actionable event.

Accordingly, the media device 110 may provide an improved viewing experience for live or recorded media content by allowing the user to view only segments of interest (e.g., where the activity or amount of action is high) while skipping segments that do not interest the user (e.g., lulls in action). Moreover, when viewing a live event, aspects of the present disclosure may allow the user to view and/or rewind to any actionable events that the user may have missed (e.g., because the user was distracted or temporarily left the vicinity of the media device 110).

Figure 2:
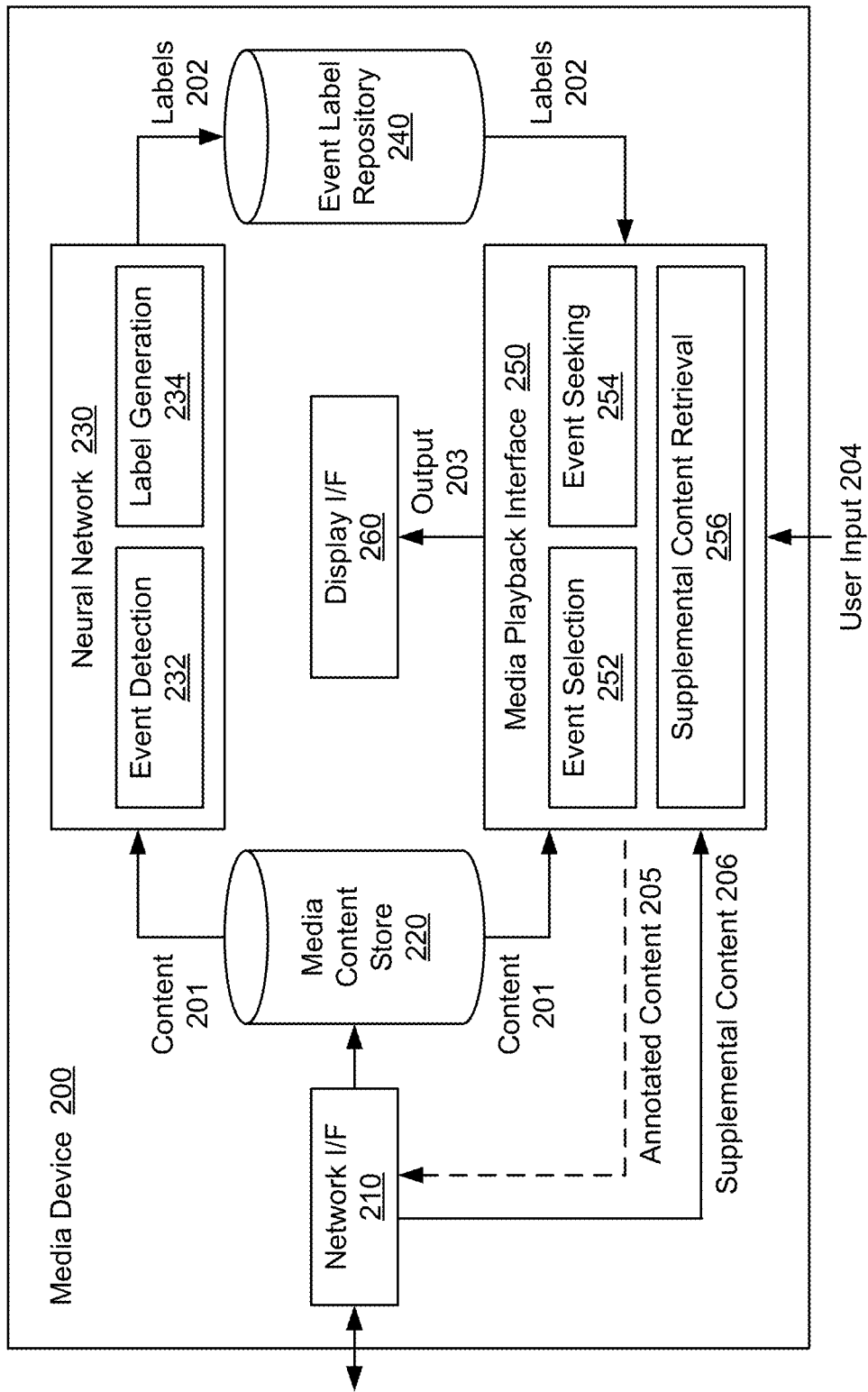
FIG. 2 shows a block diagram of a media device, in accordance with some embodiments.

FIG. 2 shows a block diagram of a media device 200, in accordance with some embodiments. The media device 200 may be one embodiment of the media device 110 of FIG. 1. The media device 200 includes a network interface (I/F) 210, a media content store 220, a neural network 230, an event label store 240, a media playback interface 250, and a display interface 260.

The network interface 210 is configured to receive media content items 201 from one or more content delivery networks. In some aspects, the content items 201 may include audio and/or video associated with live or streaming sports programming (e.g., baseball games, football games, tennis matches, and the like), news, awards shows, or other live broadcasts. In some other aspects, the content items 201 may include audio and/or video associated with television shows, movies, and/or media content created by a third-party content creator or provider (e.g., television network, production studio, streaming service, and the like).

The received content items 201 are stored or buffered in the media content store 220. In some embodiments, the media content store 220 may store or buffer the content items 201 for subsequent or immediate playback. For example, in some aspects, the content store 220 may operate as a decoded video frame buffer that stores or buffers the (decoded) pixel data associated with the content items 201 to be rendered or displayed by the media device 200 or a display coupled to the media device 200 (not shown for simplicity).

The neural network 230 is configured to generate one or more inferences about the content items 201 stored in the media content store 220. For example, the neural network 230 may be one embodiment of the event detector 114 of FIG. 1. Thus, the neural network 230 may generate inferences about the content items 201 using one or more neural network models stored on the media device 200. For example, as described with respect to FIG. 1, the neural network 230 may receive trained neural network models (e.g., from the deep learning environment 101) prior to receiving the content items 201 via the network interface 210.

The neural network 230 may include an event detection module 232 and a label generation module 234. In some embodiments, the event detection module 232 may be configured to detect actionable events in the content items 201. As described above, an actionable event may correspond to any action (or series of actions) that immediately precedes and/or forms at least part of a segment of interest to the user. Aspects of the present disclosure recognize that actionable events may be defined or governed by the rules and/or mechanics of the actions that follow. In baseball, for example, the pitcher is required to come to a pause or rest before initiating the pitching motion. Furthermore, the pitching motion generally follows the same biomechanics (e.g., windup, early cocking, late cocking, early acceleration, late acceleration, deceleration, and follow-through) from pitch to pitch, across different pitchers.

In some embodiments, the event detection module 232 may implement one or more neural network models that have been trained to detect or infer one or more actionable events in media content. For example, if the content item 201 includes a baseball game, the event detection module 232 may implement a neural network model trained to detect an act of pitching a baseball in a frame, or sequence of frames, of the content item 201. Similarly, if the content item 201 includes a football game, the event detection module 232 may implement a neural network model trained to detect an act of snapping a football in a frame, or sequence of frames, of the content item 201. Still further, if the content item 201 includes a tennis match, the event detection module 232 may implement a neural network model trained to detect an act of serving a tennis ball in a frame, or sequence of frames, of the content item 201.

Actionable events have been described in the context of sports for example purposes only. In other implementations, the event detection module 232 may be configured to detect various forms of actionable events in various forms of media. For example, a particular cadence may precede a segment of interest in an audio recording (such as the hook or chorus of a song). In another example, a particular object or image may precede a segment of interest in a video recording (such as the title sequence or ending credits of a television show or movie).

In some other embodiments, the event detection module 232 may be configured to detect one or more restricted events in media content. In contrast to an actionable event, a restricted event may correspond to an action or event that immediately precedes and/or forms at least part of a segment of media content that the user is required to view. The restricted events may precede, or coincide with, advertisements (e.g., commercials), warnings, and/or other segments of media that may be important for the user to watch. For example, advertisements may provide a substantial source of revenue for the owners and distributors of media content. On the other hand, warnings may provide the viewer with legal notice about the content they are about to view. Thus, in some aspects, the media device 200 may prevent the user from skipping or otherwise avoiding playback of any segments of required viewing.

Aspects of the present disclosure recognize that segments of required viewing are often delineated from the primary media (e.g., the sports program) by a series of blank frames. For example, the content item 201 may display a blank (e.g., black) screen for a brief duration during the transition from the primary media to the advertisement. Similarly, the content item 201 may display a blank screen during the transition from a warning (such as an anti-piracy warning, a viewer discretion warning, and the like) to the primary media. Thus, in some embodiments, the event detection module 232 may be configured to detect the one or more restricted events based at least in part on sequences of blank frames in the content item 201. In some other embodiments, the event detection module 232 may be configured to detect the one or more restricted events using one or more neural network models, for example, to infer transitions between the primary media and other content (such as advertisements, warnings, and the like).

The label generation module 234 may generate one or more event labels 202 indicating the location or position of each actionable event and/or restricted event in the content item 201. For example, the event labels 202 may act as markers that can be used to quickly locate or identify segments of interest and/or segments of required viewing in the associated content item 201. As described in greater detail below, an actionable event (such as a pitching motion) may be detected over multiple frames of media. Thus, in some embodiments, the event label 202 for an actionable event may mark the beginning or start of the actionable event. For example, in some aspects, an event label 202 may include a frame number or identifier of the first frame of an actionable event. In some other aspects, an event label 202 may indicate the timing of the first frame of an actionable event relative to a timeline for the content item 201. In some other embodiments, the event label 202 for an actionable event may mark the ending of the actionable event (e.g., where the actionable event is not included in the segment of interest).

In some embodiments, the event label 202 for a restricted event may point to any blank frame at which the restricted event is detected. As described above, a restricted event may be detected as a series of blank frames during the transition between the primary media and the corresponding segment of required viewing. Since each of the blank frames is substantially identical, any of the blank frames for which the restricted event is detected may suffice for the event label 202. In some aspects, the event label 202 may mark the beginning or start of a segment of required viewing (e.g., where the restricted event corresponds to the blank frames preceding an advertisement). In some other aspects, the event label 202 may mark the end of a segment of required viewing (e.g., where the restricted event corresponds to the blank frames following a warning).

The event labels 202 are stored or buffered in the event label repository 240. In some embodiments, the event label repository 240 may be categorized or indexed based on the content items 201 stored in the media content store 220. For example, each layer of the event label repository 240 may store the event labels 202 for a different content item 201 stored in the media content store 220. In some other embodiments, the event label repository 240 may be included in (or part of) the media content store 220. For example, the event labels 202 may be stored in association with the content items 201 from which they are derived.

The media playback interface 250 is configured to render the content items 201 for display while providing a user interface through which the user may control, navigate, or otherwise manipulate playback of the content items 201 based, at least in part, on the event labels 202. For example, the media playback interface 250 may generate an interactive output 203 based on the content items 201 and event labels 202. The output 203 may be displayed, via the display interface 260, on a display coupled to or provided on the media device 200. The output 203 may include at least a portion of a content item 201 selected for playback. More specifically, the portion of the content item 201 included in the output 203 may be dynamically selected and/or updated based, at least in part, on user inputs 204 received by the media playback interface 250. In some embodiments, the media playback interface 250 may associate the user inputs 204 with event labels 202 to determine the portion of the content item 201 to be included in the output 203.

In some aspects, the media playback interface 250 may include an event selection module 252, an event seeking module 254, and a supplemental content retrieval module 256. The event selection module 252 may provide a listing of the actionable events in a particular content item 201 (e.g., via the output 203) and may respond to user inputs 204 by jumping to an actionable event based, at least in part, on its associated event label 202. For example, the event selection module 252 may display a list of pitches in a baseball game. In some aspects, the events may be organized and/or presented in a hierarchical order. For example, the top level of the hierarchy may comprise various types or categories of events (e.g., hits, catches, pitches, etc.) and under each category may be a listing of the specific events of the given type (e.g., a listing of hits, a listing of catches, a listing of pitches, etc.). When the user selects a particular pitching event, the event selection module 252 may selectively jump to the location of that event in the displayed content item 201 based on the event label 202 associated with the event.

The event seeking module 254 may allow the user to scan through the actionable events in a particular content item 201 in sequence. In some aspects, the event seeking module 254 may respond to user inputs 204 by selectively fast-forwarding to the location of the next event label 202 in the displayed content item 201. In some other aspects, the event seeking module 254 may respond to user input by rewinding to the location of the previous event label 202 in the displayed content item 201. For example, the event seeking module 254 may allow the user to fast-forward to the next pitch or rewind to the previous pitch in a baseball game.

In some embodiments, the event seeking module 254 may reject or deny a user's attempt to fast-forward to the next actionable event if doing so would result in skipping over a restricted event. For example, upon receiving a user input 204 corresponding to a fast-forward attempt, the event seeking module 254 may scan the event labels 202 stored in the event label repository 240 to determine whether a restricted event occurs between a current frame of the content item 201 being displayed and the next actionable event. If no restricted event is detected between the current frame and the next actionable event, the event seeking module 254 may proceed to play back the content item 201 at the location associated with the next actionable event.

However, if a restricted event is detected between the current frame and the next actionable event, the event seeking module 254 may reject the user input 204. In some aspects, the event seeking module 254 may continue to play back the content item 201 from the current location. In some other aspects, the event seeking module 254 may initiate playback of the content item 201 at the restricted event (e.g., rather than the next actionable event). Still further, in some aspects, the event seeking module 254 may provide an indication to the user (such as by outputting a message via the display interface 260) that event-based fast-forwarding is disabled for the current portion of the content item 201.

The supplemental content retrieval module 256 may retrieve supplemental content 206 based, at least in part, on the actionable event associated with the user input 204. In some embodiments, the supplemental content 206 may include one or more images or frames of video that are similar or otherwise related to the actionable event and/or the segment of interest associated with the actionable event. For example, if the segment of interest corresponds with a baseball player hitting a home run, the supplemental content retrieval module 256 may retrieve supplemental media 206 containing images or video of previous home runs hit by the same baseball player. In another example, if the segment of interest corresponds with a baseball team winning the World Series, the supplemental content retrieval module 256 may retrieve supplemental content 206 containing advertisements for sportswear or memorabilia related to the championship-winning team.

In some embodiments, the supplemental content 206 may be retrieved from a content delivery network (such as the content delivery network 120 of FIG. 1). For example, the content delivery network may include a database (D) of supplemental content items ($v_i$) that are indexed (i) in relation to corresponding events ($e_i$). When the media playback interface 250 retrieves an event label 202 associated with a user input 204, the supplemental content retrieval module 256 may select the event ($e_{best}$) that is closest (e.g., most similar) to the event label 202 and retrieve the corresponding content item ($v_{best}$) from the database D. In some aspects, the supplemental content retrieval module 256 may determine the closest event $e_{best}$ by computing a distance metric between the event label 202 and all events $\{e_i\}$ in the database D.

Aspects of the present disclosure recognize that the relatedness of the supplemental content 206 to the segment of interest in the content item 201 may depend, at least in part, on the amount or granularity of information in the event labels 202. For example, if the event labels 202 indicate or describe only the actionable event (e.g., throwing a pitch), then the supplemental content retrieval module 256 may retrieve supplemental content 206 that shows the same actionable event (e.g., baseball pitches). However, if the event labels 202 include more detailed descriptions about the play resulting from the pitch, the supplemental content retrieval module 256 may fine-tune the search results to be more closely related or relevant to the segment of interest. For example, if an event label 202 indicates that Barry Bonds hit a homerun on a fastball pitch from Roger Clemens, the supplemental content retrieval module 256 may only retrieve supplemental content 206 that shows Barry Bonds hitting a homerun, Roger Clemens pitching a fastball, or any combination thereof.

In some embodiments, the event labels 202 may include information about not only the actionable event but also the segment of interest associated with the actionable event. For example, after the event detection module 232 detects an actionable event in the content item 201, the label generation module 234 may scan a plurality of frames beyond (or before) the actionable event to infer additional information about the segment of interest using one or more neural network models. The label generation module 234 may then store the additional information, with the event label 202 for the actionable event, in the event label repository 240. In the example of a baseball program, such additional information may include, but is not limited to, player names or identities (e.g., name or number of pitcher, batter, catcher, etc.), type of play or formation (e.g., fastball, curveball, slider, etc.), and result of the play (e.g., ball, hit, strike, run, etc.).

The media playback interface 250 may display or play back the supplemental content 206 together with the segment of interest in the content item 201. In some aspects, the media playback interface 250 may display or play back the supplemental content 206 concurrently with the corresponding segment of interest (e.g., as a picture-in-picture). In some other aspects, the media playback interface 250 may display or play back the supplemental content 206 in isolation (e.g., at full-frame resolution), before or after the corresponding segment of interest. In some other implementations, the media playback interface 250 may present the user with an option to display or play back the supplemental content 206 upon jumping or skipping to the location in the content item 201 associated with the actionable event.

Still further, in some embodiments, the media playback interface 250 may generate annotated content 205 based on the content items 201 and the event labels 202. For example, the media playback interface 250 may add the event labels 202 to their associated content items 201 to generate the annotated content 205. Accordingly, the annotated content 205 may be used to provide event-based media playback on other media devices (such as media devices that may not have access to trained neural network models and/or machine learning architectures). In some aspects, the media device 200 may transmit the annotated content 205 to other media devices via the network interface 210.

In some other embodiments, the media device 200 may receive annotated content from other devices on the network (e.g., via the network interface 210). For example, the media device 200 may parse the content items 201 and the event labels 202 from the received annotated content. As a result, the media device 200 may directly store the content items 201 and the associated event labels 202 in the media content store 220 and event label repository 240, respectively, without utilizing the neural network 230.

Figure 3:
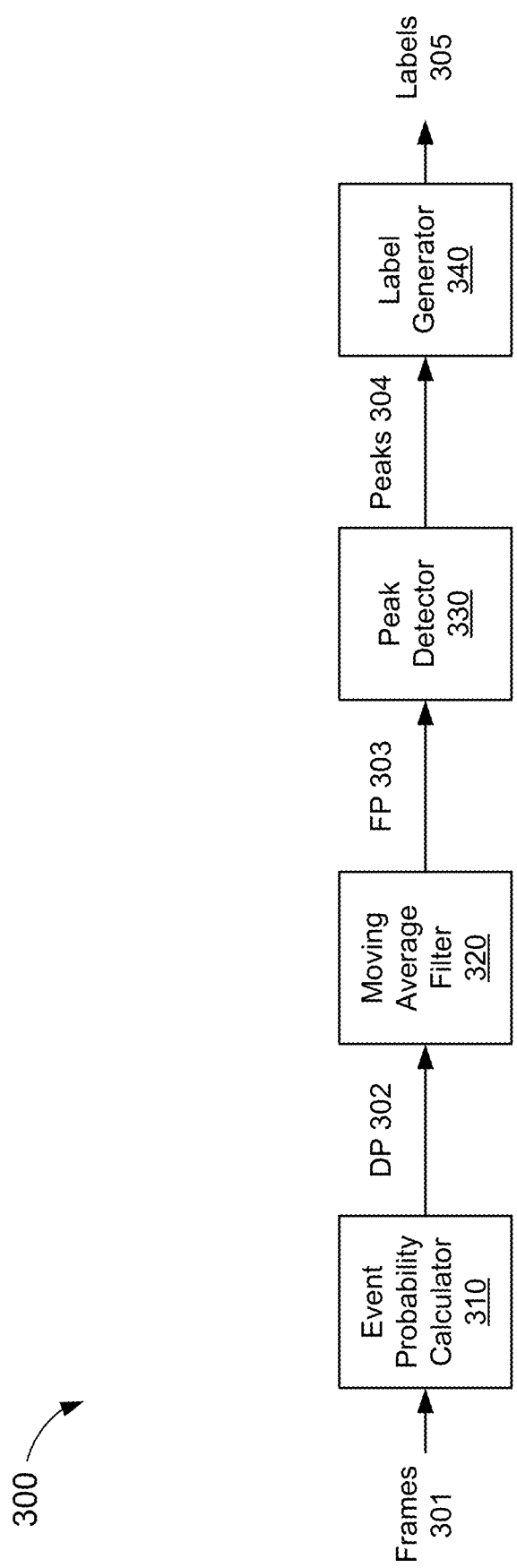
FIG. 3 shows a block diagram of an event detector for media content, in accordance with some embodiments.

FIG. 3 shows a block diagram of an event detector 300 for media content, in accordance with some embodiments. The event detector 300 may be one embodiment of the neural network 230 of FIG. 2. The event detector 300 may be configured to generate one or more inferences about media content to be played back on a media device. In some embodiments, the event detector 300 may detect actionable events in the media content using one or more neural network models. The event detector 300 includes an event probability calculator 310, a moving average filter 320, a peak detector 330, and a label generator 340.

The event probability calculator 310 receives one or more frames 301 of media content and computes a discrete probability (DP) 302 of an actionable event occurring in each frame (e.g., using a deep neural network model). As described above, an actionable event may correspond to any action (or series of actions) that immediately precedes and/or forms at least part of a segment of interest to the user. In some embodiments, the event probability calculator 310 may implement neural network models that are trained to detect one or more actionable events in media. Aspects of the present disclosure recognize that an actionable event (such as pitching a baseball) may span multiple frames of media content. Thus, in some aspects, the event probability calculator 310 may detect the probability of an actionable event occurring in a given frame 301 based, at least in part, on an analysis of a number (k) of frames surrounding the given frame 301. The probability of detecting an actionable event tends to be highest in the frames 301 toward the center or midpoint of the event and tapers off towards the beginning and ending of the event.

Generally, for any batch of k frames, the probability of detecting an actionable event in a given frame 301 may depend upon the $(k-1)/2$ frames preceding the given frame 301 and the (k−1)/2 frames subsequent the given frame 301. For example, a pitching action (e.g., in baseball) generally comprises seven distinct steps: windup, early cocking, late cocking, early acceleration, late acceleration, deceleration, and follow-through. The probability of detecting a pitch (e.g., the actionable event) in a given frame 301 may be greater when more of the frames before and/or after the given frame 301 satisfy known criteria (e.g., in the neural network models) associated with the pitching motion. Thus, the probability of detecting a pitch may be greatest in the frames 301 associated with the midpoint of the pitching motion (e.g., early acceleration) and significantly lower in the frames 301 associated with the beginning (e.g., windup) and ending (e.g., follow-through) of the pitching motion.

Figure 4:
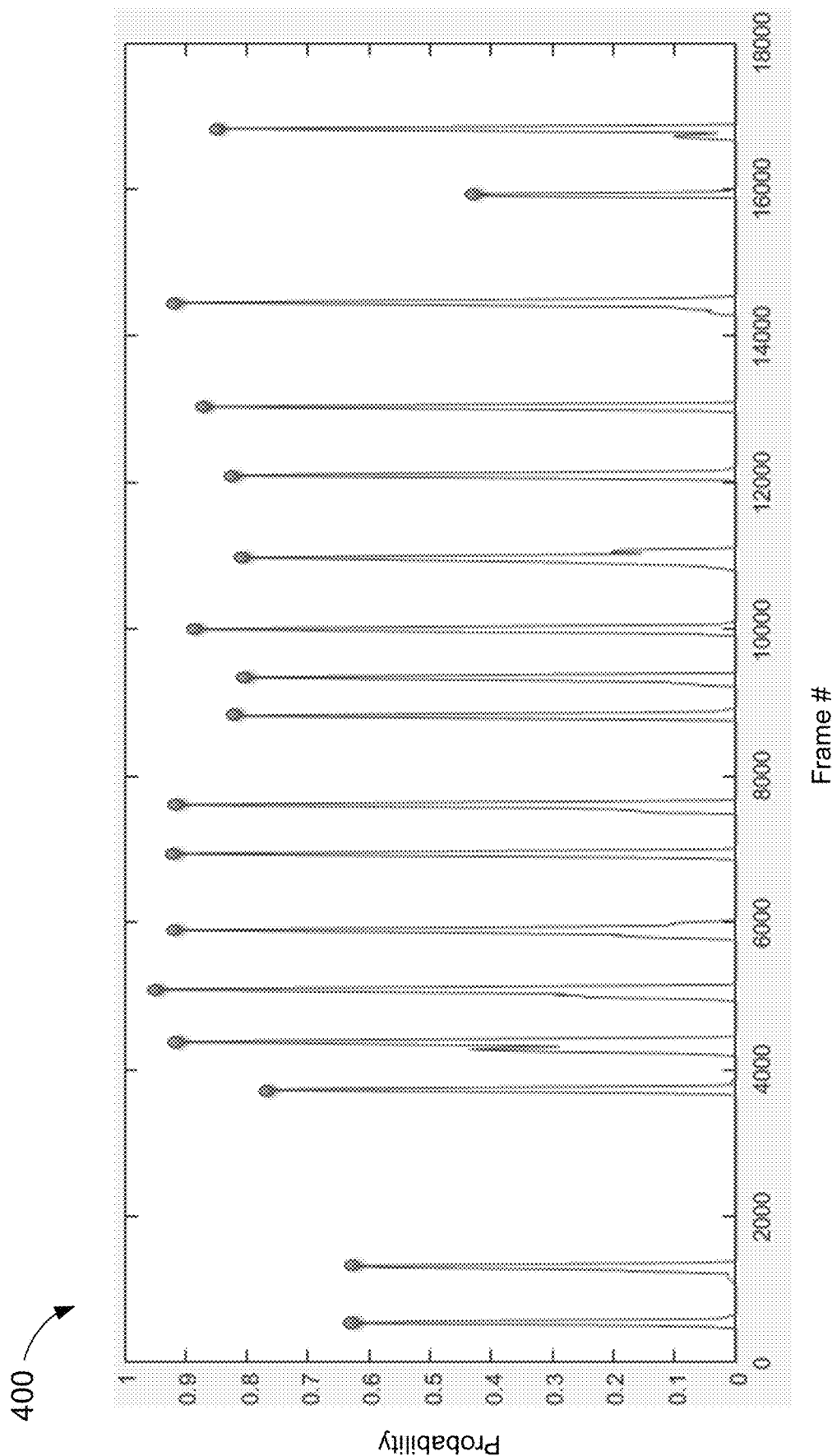
FIG. 4 shows a graph depicting an example mapping of event probabilities in a media content item, in accordance with some embodiments.

The moving average filter 320 averages the discrete probabilities 302 over the duration of the actionable event to generate a set of filtered probabilities (FP) 303. For example, each actionable event may last an average number (n) of seconds. Thus, the moving average filter 320 may improve the detection of an actionable event by smoothing the discrete probabilities 302 over a number (f) of frames corresponding to the average duration of the actionable event (e.g., n seconds). In some embodiments, the moving average filter 320 may calculate a running average of the discrete probabilities 302 (e.g., averaged over f frames). For example, while the per-frame probability of detecting an actionable event (e.g., the discrete probabilities 302) may vary or fluctuate from frame to frame, the filtered probabilities 303 may follow a much smoother and well-defined curve (e.g., as shown in FIG. 4). In some other embodiments, the moving average filter 320 may utilize various other averaging statistics (e.g., median) to produce the filtered probabilities 303.

The peak detector 330 detects the locations of peaks 304 in the filtered probabilities 303. For example, each peak 304 may coincide with the highest probability of an actionable event occurring over a given number of frames of the selected media content (e.g., f frames). Thus, the peaks 304 may be used to identify the instances in which actionable events occur in the selected media content. In some embodiments, the peak detector 330 may determine the frame number or timestamp associated with each of the identified peaks 304. With reference for example to FIG. 4, the example graph 400 shows seventeen peaks distributed across 18000 frames. More specifically, in the example of FIG. 4, the peak detector 330 may detect peaks occurring at frames 500, 1200, 3800, 4200, 5000, 5900, 7000, 7800, 9000, 9500, 10000, 11000, 12100, 13000, 14200, 15900, and 17000. Each of the peaks may correspond to one of seventeen actionable events in the selected media content (e.g., 17 pitches in a baseball game, 17 snaps in a football game, 17 serves in a tennis match, etc.).

The label generator 340 generates an event label 305 based, at least in part, on the locations of the peaks 304. As described above, the event labels 305 may act as markers that can be used to quickly locate or identify segments of interest in the selected media content. In some embodiments, the event labels 305 may mark the beginning or start of an actionable event. Since each peak 304 may coincide with the midpoint of an actionable event, the beginning of the actionable event may occur a number ((f−1)/2) of frames before the peak 304. Thus, in some aspects, each event label 305 may indicate the frame number or timestamp associated with the beginning of the actionable event. In some other embodiments, the event labels 202 may mark the ending of an actionable event. Since each peak 304 may coincide with the midpoint of an actionable event, the ending of the actionable event may occur a number ((f−1)/2) of frames after the peak 304.

Some video content may be encoded as a series of intra-coded frames (e.g., i-frames) and predicted frames (e.g., p-frames) using various video compression techniques. Each i-frame includes a complete image and therefore can be rendered on its own (e.g., does not require other video frames to decode). In contrast, p-frames include only the changes or differences from a previous frame and therefore depend on previous frame information to decode. Aspects of the present disclosure recognize that, as a result of the calculations performed by the peak detector 330 and/or the label generator 340, one or more of the event labels 305 may coincide with a p-frame. In some embodiments, when a user requests playback at an event label 305 coinciding with a p-frame, the media playback application (e.g., the media playback interface 250 of FIG. 2) may begin playback at the nearest i-frame preceding the event label 305. In some other embodiments, the label generator 340 may only generate event labels 305 at i-frames (e.g., the nearest i-frame preceding the start of each actionable event).

Figure 5:
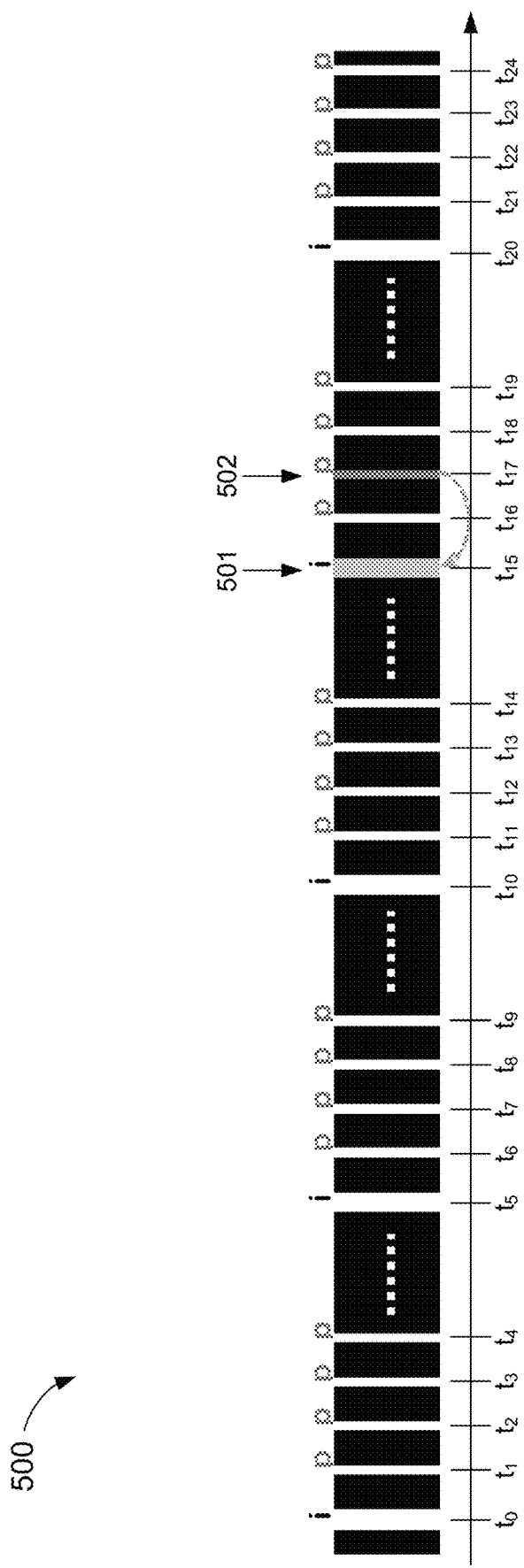
FIG. 5 shows a timeline depicting an example sequence of media frames configured for playback, in accordance with some embodiments.

FIG. 5 shows a timeline 500 depicting an example sequence of media frames configured for playback, in accordance with some embodiments. The timeline 500 shows a number of i-frames at times $t_0$, $t_5$, $t_{10}$, $t_{15}$, and $t_{20}$ each followed by a series of four p-frames at times $t_1$-$t_4$, $t_6$-$t_9$, $t_{11}$-$t_{14}$, $t_{16}$-$t_{19}$, and $t_{21}$-$t_{24}$, respectively. In the example of FIG. 5, a user may request to jump, skip, or otherwise begin playback at an actionable event coinciding with the p-frame 502 at time $t_{17}$. In some embodiments, the media playback application (e.g., the media playback interface 250 of FIG. 2) may respond to the user input by initiating playback at the nearest i-frame 501 preceding the selected p-frame 502. Accordingly, playback of the media content depicted in FIG. 5 may begin at time $t_{15}$ based, at least in part, on an event label pointing to the p-frame 502 at time $t_{17}$.

Figure 6:
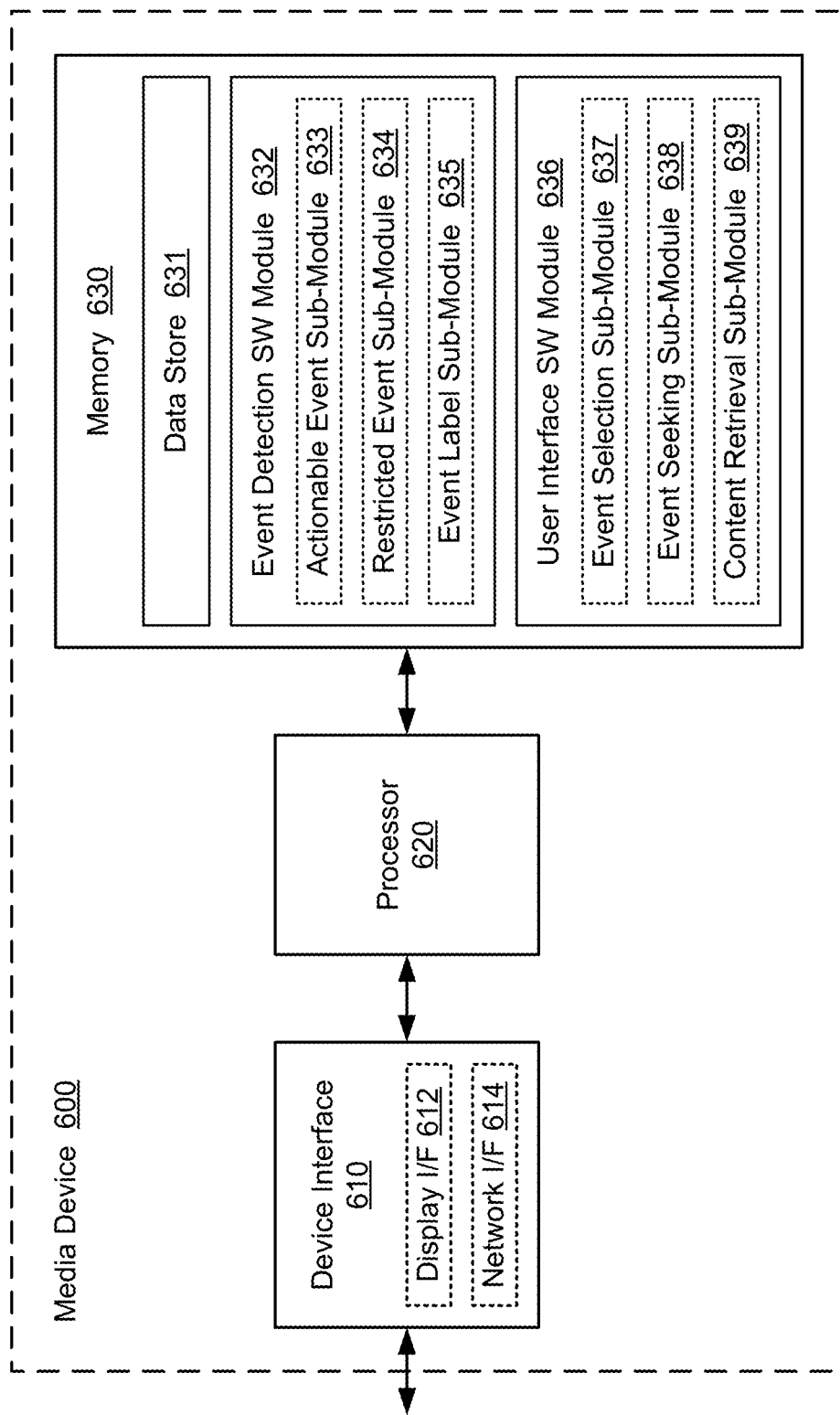
FIG. 6 shows another block diagram of a media device, in accordance with some embodiments.

FIG. 6 shows another block diagram of a media device 600, in accordance with some embodiments. The media device 600 may be one embodiment of the media device 110 of FIG. 1 and/or media device 110 of FIG. 1. In some embodiments, the media device 600 may be configured to provide event-based playback of media content. The media device 600 includes a device interface 610, a processor 620, and a memory 630.

The device interface 610 may include a display interface (I/F) 614 and a network interface (I/F) 614. The display interface 614 may be used to communicate with a display of the media device. For example, the display interface 614 may output media content (e.g., pixel data) to be rendered or played back on the display. In some aspects, the display may be integrated as a physical part of the media device 600. In some other aspects, the display may be physically separated from the media device 600. For example, the display may be coupled to (and communicate with) the media device 600 using various wired and/or wireless interconnection and communication technologies. The network interface 614 may be used to communicate with one or more external network resources. For example, the network interface 614 may receive media content items from one or more content delivery networks (such as the content delivery networks 120 of FIG. 1).

The memory 630 includes a data store 631 configured to store or buffer media content, neural network models, inference results, event labels, and/or other data that can be used by the media device 600 to enable event-based media playback. The memory 630 may also include a non-transitory computer-readable medium (e.g., one or more nonvolatile memory elements, such as EPROM, EEPROM, Flash memory, a hard drive, etc.) that may store at least the following software (SW) modules:

- an event detection SW module 632 to generate inferences about media content using one or more neural network models, the event detection SW module 632 further including:
  - an actionable event sub-module 633 to infer one or more actionable events corresponding with segments of interest in a media content item;
  - a restricted event sub-module 634 to infer one or more restricted events corresponding with segments of required viewing in the media content item; and
  - an event label sub-module 635 to generate one or more event labels indicating the location or position of each actionable event and/or restricted event in the media content item; and
- a user interface SW module 636 to provide an interface through which a user may control, navigate, or otherwise manipulate playback of the media content based, at least in part, on the detected events, the user interface SW module 636 further including:
  - an event selection sub-module 637 to respond to user inputs by jumping to an actionable event based, at least in part, on its associated event label;
  - an event seeking sub-module 638 to respond to user inputs by selectively fast-forwarding, or rewinding, through the actionable events in sequence; and
  - a content retrieval sub-module 639 to retrieve supplemental media content based, at least in part, on the actionable event associated with the user input.

Each software module includes instructions that, when executed by the processor 620, cause the media device 600 to perform the corresponding functions. The non-transitory computer-readable medium of memory 630 thus includes instructions for performing all or a portion of the operations described below.

The processor 620 may be any suitable one or more processors capable of executing scripts or instructions of one or more software programs stored in the display device 600 (e.g., within memory 630). For example, the processor 620 may execute the event detection SW module 632 to generate inferences about media content using one or more neural network models. In executing the event detection SW module 632, the processor 620 may further execute the actionable event sub-module 633, the restricted event sub-module 634, and/or the event label sub-module 635. For example, the processor 620 may execute the actionable event sub-module 633 to infer one or more actionable events corresponding with segments of interest in a media content item. Further, the processor 620 may execute the restricted event sub-module 634 to infer one or more restricted events corresponding with segments of required viewing in the media content item. Still further, the processor 620 may execute the event label sub-module 635 to generate one or more event labels indicating the location or position of each actionable event and/or restricted event in the media content item.

The processor 620 also may execute the user interface SW module 636 to provide an interface through which a user may control, navigate, or otherwise manipulate playback of the media content based, at least in part, on the detected events. In executing the user interface SW module 636, the processor 620 may further execute the event selection sub-module 637, the event seeking sub-module 638, and/or the content retrieval sub-module 639. For example, the processor 620 may execute the event selection sub-module 637 to respond to user inputs by jumping to an actionable event based, at least in part, on its associated event label. Further, the processor 620 may execute the event seeking sub-module 638 to respond to user inputs by selectively fast-forwarding, or rewinding, through the actionable events in sequence. Still further, the processor 620 may execute the content retrieval sub-module 639 to retrieve supplemental media content based, at least in part, on the actionable event associated with the user input.

Figure 7:
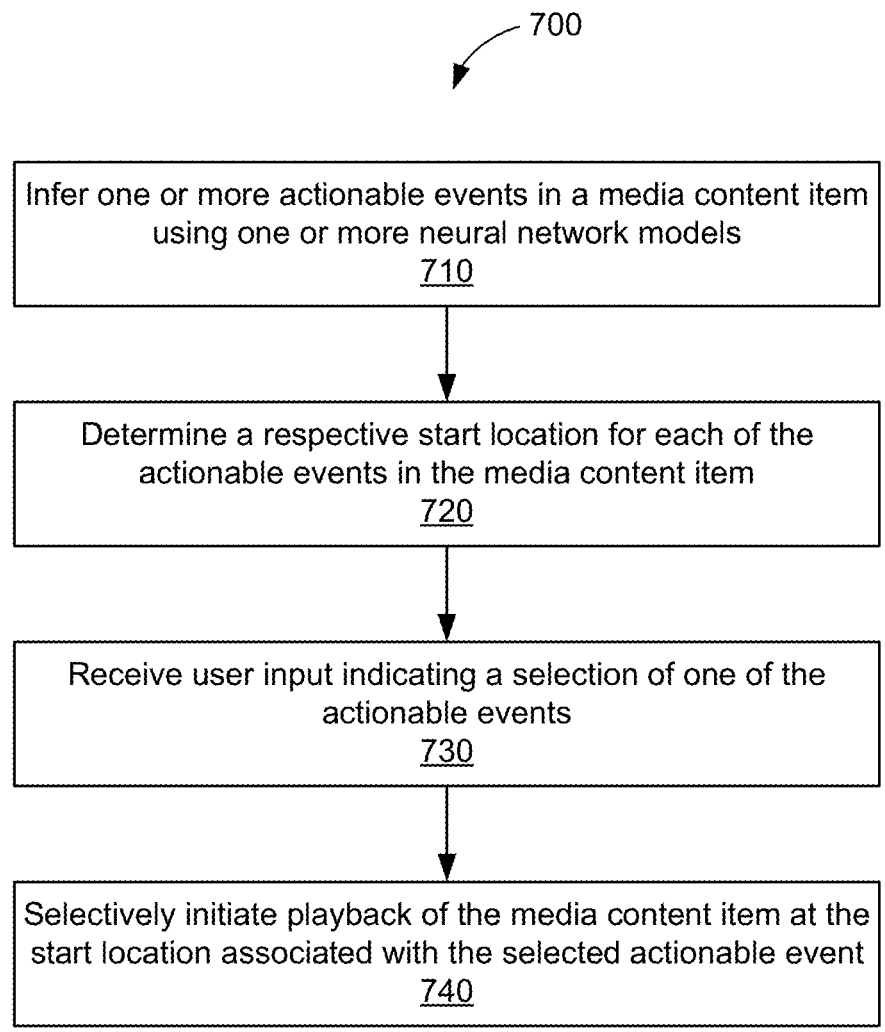
FIG. 7 is an illustrative flowchart depicting an example event-based media playback operation, in accordance with some embodiments.

FIG. 7 is an illustrative flowchart depicting an example event-based media playback operation 700, in accordance with some embodiments. With reference for example to FIG. 2, the operation 700 may be performed by the media device 200 to provide a richer user experience when playing back live, streaming, or pre-recorded media content.

The media device infers one or more actionable events in a media content item using one or more neural network models (710). As described above, an actionable event may correspond to any action (or series of actions) that immediately precedes and/or forms at least part of a segment of interest to the user. In some embodiments, the media device may implement one or more neural network models that have been trained to detect or infer one or more actionable events in media content. For example, if the content item includes a baseball game, the media device may implement a neural network model trained to detect an act of pitching a baseball (e.g., the actionable event) in a frame, or sequence of frames, of the content item.

The media device determines a respective start location for each of the actionable events in the media content item (720). For example, an actionable event (such as a pitching motion) may be detected over multiple frames of media. Thus, the media device may determine a frame number or other indicator of the start of each actionable event based, at least in part, on the duration of the actionable events (such as described with respect to FIGS. 3 and 4). In some embodiments, the media device may generate one or more event labels indicating the location or position of each actionable event in the media content item. For example, the event labels may act as markers that can be used to quickly locate or identify segments of interest in the associated media content item.

The media device further receives user input indicating a selection of one of the actionable events (730). In some aspects, media device may provide a listing of the actionable events in the media content item. Accordingly, the user input may correspond with a selection of a particular actionable event from the listing of actionable events. In some other aspects, the user input may correspond with an event-seeking input to scan through the actionable events in a chronological sequence (e.g., according to a timeline of the media content item). In one example, the event-seeking input may be a request to fast-forward to the next actionable event in the sequence. In another example, the event-seeking input may be a request to rewind to a previous actionable event in the sequence.

The media device responds to the user input by selectively initiating playback of the media content item at the start location associated with the selected actionable event (740). In some embodiments, the media device may respond to user inputs by jumping to the selected actionable event based, at least in part, on it associated event label. In some other embodiments, the media device may respond to user inputs by selectively fast-forwarding to the location of the next event label (e.g., in chronological sequence) in the media content item. Still further, in some embodiments, the media device may respond to user inputs by rewinding to the location of the previous event label in the media content item.

Figure 8:
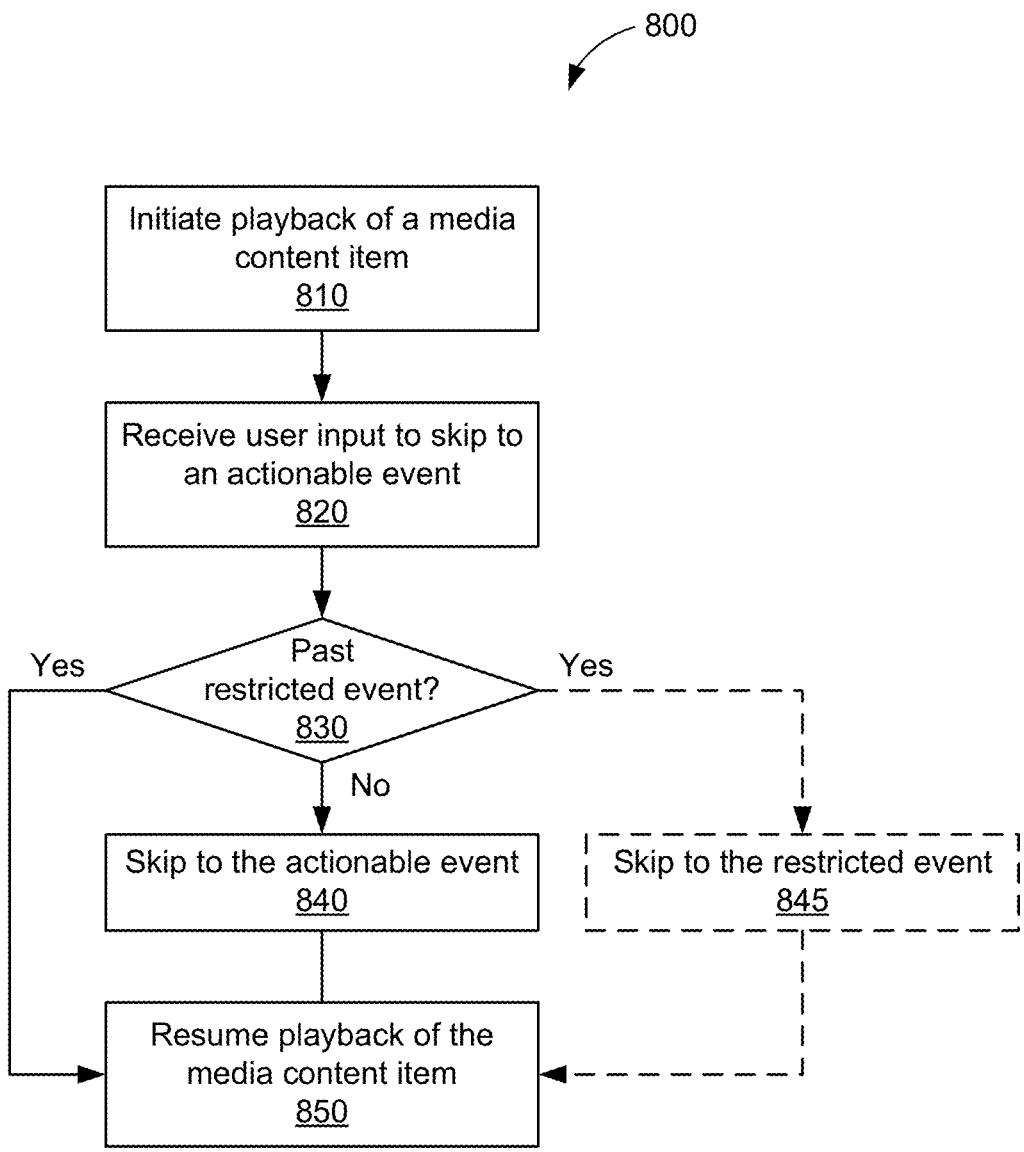
FIG. 8 is an illustrative flowchart depicting another event-based media playback operation, in accordance with some embodiments.

FIG. 8 is an illustrative flowchart depicting another event-based media playback operation 800, in accordance with some embodiments. With reference for example to FIG. 2, the operation 800 may be performed by the media device 200 to prevent the user from circumventing restricted events and/or segments of required viewing in media content items.

The media device initiates playback of a media content item (810) and receives a user input to skip to an actionable event (820). For example, the playback may be initiated from the start of the media content item or from a segment of interest associated with an actionable event. The user input may correspond with a request to fast-forward to the next actionable event (e.g., in chronological sequence) in the media content item.

Upon receiving the user input, the media device determines whether the skipping to the actionable event would result in jumping past (or bypassing) a restricted event in the media content item (830). More specifically, the media device may determine whether a restricted event occurs between the actionable event and the current frame of the media content item being displayed. As described above, restricted events correspond with segments of required viewing, such as advertisements, warnings, and the like.

If skipping to the actionable event would not result in jumping past any restricted events (as tested at 830), the media device may proceed by skipping to the actionable event (840) and resuming playback of the media content item from the location associated with the actionable event (850). However, if skipping to the actionable event would result in jumping past one or more restricted events (as tested at 830), the media device may reject the corresponding user input.

In some embodiments, the media device may reject the user input by taking no further action, and continuing playback of the media content item from the current frame or location (850). In some other embodiments, the media device may reject the user input by skipping to the restricted event (845), rather than the actionable event, and resuming playback of the media content item from the location associated with the restricted event (850). In some aspects, the media device may further provide an indication to the user (such as by outputting a message via the display) that event-based fast-forwarding is disabled for the current portion of the media content item.

Figure 9:
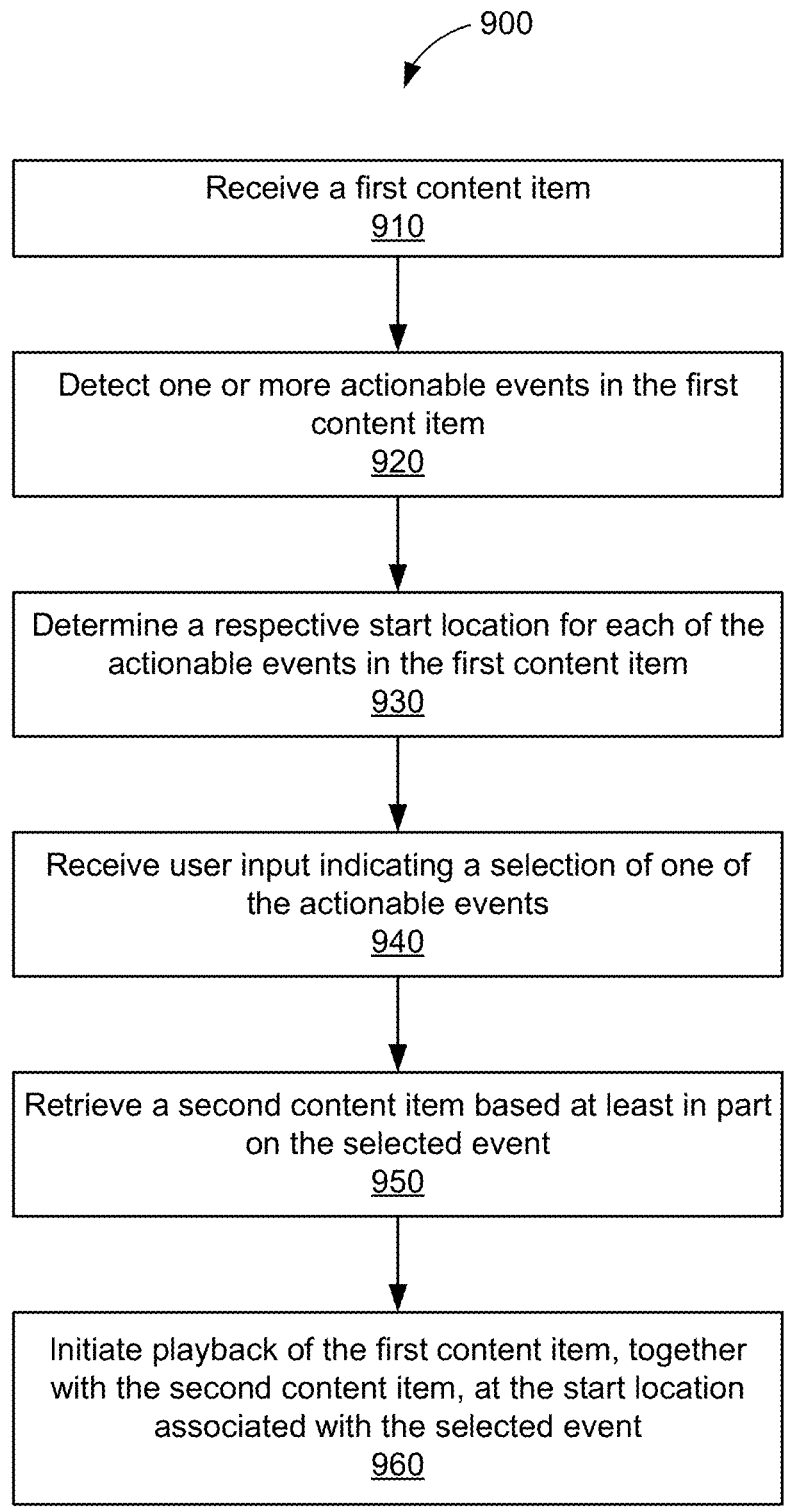
FIG. 9 is an illustrative flowchart depicting another event-based media playback operation, in accordance with some embodiments.

FIG. 9 is an illustrative flowchart depicting another event-based media playback operation 900, in accordance with some embodiments. With reference for example to FIG. 2, the operation 900 may be performed by the media device 200 to provide supplemental media content while playing back a segment of interest in a media content item.

The media device receives a first content item (910) and detects one or more actionable events in the first content item (920). The first content item may include live, streaming, or pre-recorded media received from a content delivery network (such as the content delivery networks 120 of FIG. 1). In some embodiments, the media device may detect the one or more actionable events in the first content item using one or more neural network models that have been trained to detect or infer the actionable events.

The media device determines a respective start location for each of the actionable events in the first content item (930). For example, the media device may determine a frame number or other indicator of the start of each actionable event in the first content item based, at least in part, on the duration of each actionable event. In some embodiments, the media device may generate one or more event labels indicating the location or position of each actionable event in the media content item. Further, in some embodiments, the event labels may include additional information about the segment of interest associated with each actionable event.

The media device further receives user input indicating a selection of one of the actionable events (940) and retrieves a second content item based at least in part on the selected event (950). For example, the second content item may include one or more images or frames of video that are similar or otherwise related to the actionable event and/or associated segment of interest. In some embodiments, the media device may retrieve the second content item from an external database based, at least in part, on information included with the event label for the actionable event (such as described with respect to FIG. 2). The external database may reside on the same (or different) content delivery network as the first content item.

The media device responds to the user input by initiating playback of the first content item, together with the second content item, at the start location associated with the selected actionable event (960). In some embodiments, the media device may display or play back the second content item concurrently with the corresponding portion of the first content item (e.g., as a picture-in-picture). In some other embodiments, the media device may display or play back the second content item in isolation (e.g., at full-frame resolution), before or after the corresponding portion of the first content item. In some other implementations, the media device may present the user with an option to display or play back the second content item upon jumping or skipping to the location in the first content item associated with the actionable event.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of playing back media content by a media device, comprising:
   inferring one or more actionable events in a media content item using one or more neural network models by:
      determining a probability of an actionable event occurring at each of a plurality of frames spanning a duration of the media content item; and
      identifying peaks in the probabilities over the duration of the media content item;
   determining a respective start location for each of the actionable events in the media content item;
   receiving user input indicating a selection of one of the actionable events; and
   selectively initiating playback of the media content item at the start location associated with the selected actionable event.

2. The method of claim 1, wherein each of the start locations is associated with a respective one of the identified peaks.

3. The method of claim 2, wherein each of the start locations identifies a frame of the media content item preceding the respective peak.

4. The method of claim 2, further comprising:
   selecting each of the start locations based at least in part on a duration of each of the actionable events.

5. The method of claim 2, further comprising:
   selecting each of the start locations from a number of intra-coded frames (i-frames) of the media content item preceding the respective peak.

6. The method of claim 1, wherein the selectively initiating playback comprises:
   detecting a restricted event occurring subsequent to a current frame of the media content item being displayed and prior to the actionable event; and
   rejecting the user input in response to detecting the restricted event.

7. The method of claim 6, wherein the rejecting comprises:
   continuing playback of the media content item from the current frame.

8. The method of claim 6, wherein the rejecting comprises:
   initiating playback of the media content item at the restricted event.

9. The method of claim 6, wherein the restricted event is detected based at least in part on a series of consecutive blank frames in the media content item.

10. The method of claim 1, further comprising:
    retrieving a supplemental content item based at least in part on the selected actionable event; and
    playing back the supplemental content item together with a portion of the media content item from the start location associated with the selected actionable event.

11. A media device comprising:
    processing circuitry; and
    a memory storing instructions that, when executed by the processing circuitry, causes the media device to:
       infer one or more actionable events in a media content item using one or more neural network models wherein the inference comprises:
          determining a probability of an actionable event occurring at each of a plurality of frames spanning a during of the media content;
          identifying peaks in the probabilities over the duration of the media content item;
       determine a respective start location for each of the actionable events in the media content item;
       receive user input indicating a selection of one of the actionable events; and
       selectively initiate playback of the media content item at the start location associated with the selected actionable event.

12. The media device of claim 11, wherein each of the start locations identifies a frame of the media content item preceding a respective one of the identified peaks.

13. The media device of claim 12, wherein execution of the instructions further causes the media device to:
    select each of the start locations based at least in part on a duration of each of the actionable events.

14. The media device of claim 12, wherein execution of the instructions further causes the media device to:
    select each of the start locations from a number of intra-coded frames (i-frames) of the media content item preceding the respective peak.

15. The media device of claim 11, wherein execution of the instructions for selectively initiating playback of the media content item causes the media device to:
    detect a restricted event occurring subsequent to a current frame of the media content item being displayed and prior to the actionable event; and
    rejecting the user input in response to detecting the restricted event.

16. The media device of claim 15, wherein the restricted event is detected based at least in part on a series of consecutive blank frames in the media content item.

17. The media device of claim 11, wherein execution of the instructions further causes the media device to:
    retrieve a supplemental content item based at least in part on the selected actionable event; and
    play back the supplemental content item together with a portion of the media content item from the start location associated with the selected actionable event.

18. A method of playing back media content by a media device, comprising:
    receiving a first media content item;
    detecting one or more actionable events in the first media content item by:
       determining a probability of an actionable event occurring at each of a plurality of frames spanning a duration of the media content item; and
       identifying peaks in the probabilities over the duration of the media content item;
    determining a respective start location for each of the actionable events in the first media content item;
    receiving user input indicating a selection of one of the actionable events; and
    initiating playback of the first media content item at the start location associated with the selected actionable event by:

detecting a restricted event occurring subsequent to a current frame of the media content item being displayed and prior to the actionable event; and rejecting the user input in response to detecting the restricted event.

* * * * *

UNITED STATES PATENT AND TRADEMARK OFFICE
CERTIFICATE OF CORRECTION

PATENT NO. : 11,017,818 B2
APPLICATION NO. : 16/534212
DATED : May 25, 2021
INVENTOR(S) : Karthikeyan Shanmuga Vadivel, Tae won Kang and Umha Mahesh Srinivasan It is certified that error appears in the above-identified patent and that said Letters Patent is hereby corrected as shown below:

In the Claims

In Column 20, Line 9, in Claim 11, delete "during" and insert -- duration --

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*